Patented Dec. 31, 1940

2,226,627

UNITED STATES PATENT OFFICE 2,226,627

STEROLS OF THE MALE SEX HORMONE TYPE

Russell Earl Marker, David M. Jones, and Thomas S. Oakwood, State College, Pa., assignors to Parke, Davis & Company, Detroit, Mich., a corporation of Michigan No Drawing. Application March 12, 1937, Serial No. 130,584

8 Claims. (Cl. 260—397)

The invention relates to a new method for the preparation of compounds of the male sex hormone series from compounds of the female sex hormone series. The invention is more particularly concerned with preparation of a new isomer of an allo-pregnanediol and derivatives thereof from certain natural mixtures of pregnanediol and allo-pregnanediol and equivalent mixtures, and conversion of the allo-pregnanediol-3($\beta$),20($\beta$) into androstandedione, a compound belonging to the male sex hormone (androsterone) series.

Pregnanediol previously has been obtainable from human pregnancy urine. It has been proved to be a cyclo pentano phenanthrene compound having a spatial connection between rings A and B, as in the coprostane and cholanic acid series. An allo-pregnanediol, melting at 248-248½° also has previously been isolated from human pregnancy urine. This latter allo-pregnanediol is a stereo-isomer of pregnanediol and is thought to have the same connection between rings A and B as in the cholestane and allo-cholanic acid series of compounds. Androstanedione and androsterone also belong to the allo-series and have the same connection between rings A and B as for allo-pregnanediol. This is illustrated by the following formulas:

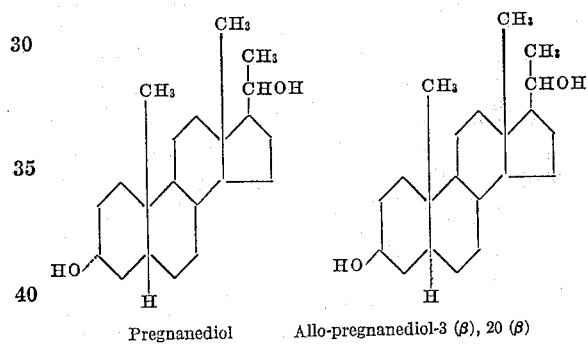

Pregnanediol    Allo-pregnanediol-3 ($\beta$), 20 ($\beta$)

Androstanedione    Androsterone

It has now been found that allo-pregnanediol-3($\beta$),20($\beta$) can be prepared in pure form from mixtures of pregnanediol and allo-pregnanediol, e. g. such as obtained in residues from extraction of the phenolic female sex hormones from human pregnancy urine, or an equivalent product obtained from other sources, by oxidizing the mixture to the corresponding dione compounds, separating the less soluble allo-pregnanedione from the more soluble pregnanedione and reducing the separate allo-pregnanedione to allo-pregnanediol-3($\beta$),20($\beta$) melting at about 195-196° C.

It has further been found that allo-pregnanediol-3($\beta$),20($\beta$) thus produced can be converted into ordinary androstanedione by a new process. In carrying out the process, the diol is converted to its diacetate which is then partially saponified to its monoacetate-(20) and the monoacete-(20) oxidized to convert the secondary alcohol group at $C_3$ into a ketone group with formation of a monoacetate of a new allo-pregnane-ol-(20)-one-(3). The latter compound is saponified to eliminate the acetyl group with production of a new allo-pregnane-ol-(20)-one-(3) which is then dehydrated to give the corresponding 3-keto compound having an ethylenic double bond between $C_{17}$ and $C_{20}$. The ethylenic compound is then oxidized at the ethylenic double bond to give ordinary androstanedione.

The invention will be more fully understood by the following examples given merely by way of illustrating the invention.

*Allo-pregnanedione.*—A solution of 50 g. of a mixture of pregnanediol and allo-pregnanediol, obtained as neutral carbinol residue in the aqueous alkali-organic solvent distribution method of Doisy et al., J. Biol. Chem. 87, 357-371 (1930), is dissolved in 3500 cc. of glacial acetic acid and cooled to 10°. To this is added a solution of 50 g. of chromic anhydride in 600 cc. of 90 percent acetic acid over a period of 4 hours. The resulting mixture is allowed to stand overnight at room temperature, when 100 cc. of methyl alcohol is added and the acetic acid distilled under reduced pressure. The residue is extracted with ether and the ether solution is washed successively with dilute hydrochloric acid, water, 10 percent sodium bicarbonate solution, and finally with water. The ether is then evaporated giving 45 g. of oily white solid. This is dissolved in 190 cc. of boiling acetone. The solution is cooled to 0° and allowed to stand for 12 hours. The precipitate is filtered, washed with a small amount of acetone, and then recrystallized from acetone.

This gives allo-pregnanedione, M. 199-200°. The mother liquors contain pregnanedione.

Anal. calcd. for $C_{21}H_{32}O_2$: C, 79.7; H, 10.2. Found: C, 79.4; H, 10.3.

*Allo-pregnanediol-3(β),20(β).*—To a solution of 3 g. of allo-pregnanedione in 100 cc. of glacial acetic acid there is added 2 g. of platinum oxide. This is shaken with hydrogen at 45 pounds pressure for 75 minutes. The catalyst is filtered off and the acetic acid concentrated under reduced pressure. The residue is crystallized from ethyl alcohol and has a M. Pt. of 195-196°. It readily gives an insoluble digitonide with digitonin.

Anal. calcd. for $C_{21}H_{36}O_2$: C, 78.7; H, 11.3. Found: C, 78.8; H, 11.4.

*Allo - pregnanediol - 3(β),20(β) diacetate.*—A solution of 300 mg. of allo-pregnanediol-3(β),20(β) of M. Pt. 195-196° in 2 cc. of acetic anhydride is refluxed during 2 hours. The reaction product which solidifies on cooling is taken up with water and filtered. The solid is crystallized first from ethyl alcohol and then from ethyl acetate. The crystals melt at 142-143°.

Anal. calcd. for $C_{25}H_{40}O_4$: C, 74.2; H, 10.0. Found: C, 74.2; H, 10.1.

*Allo - pregnanediol-3(β),20(β) monoacetate.*—To a solution of 1.55 g. of the above-described diacetate in 375 cc. of methyl alcohol is added 28.3 cc. of a methyl alcohol-potassium hydroxide solution containing 0.0062 g. of KOH per cc. The mixture is kept at 15-20° for 42 hours. It is then neutralized with dilute hydrochloric acid and evaporated to a small volume. Water is added and the product filtered. It is crystallized from petrolic ether and melts at 170-171°.

Anal. calcd. for $C_{23}H_{38}O_3$: C, 76.2; H, 10.6. Found: C, 76.3; H, 10.7.

*Acetate of allo-pregnane-ol-(20)-one-(3).*—To a solution of 360 mg. of the above-described monoacetate of allo-pregnanediol-3(β),20(β) in 25 cc. of acetic acid there is added 100 mg. of chromic oxide in acetic acid. The solution is kept at room temperature for 16 hours. Methyl alcohol is then added and the acetic acid removed under reduced pressure. Water is added and the product filtered off. It is then crystallized from ethyl alcohol and finally from petrolic ether. The M. Pt. is 156°.

Anal. calcd. for $C_{23}H_{36}O_3$: C, 76.6; H, 10.1. Found: C, 76.5; H, 10.1.

*Allo-pregnane-ol-(20)-one-(3).*—A solution of 180 mg. of the acetate of allo-pregnane-ol-(20)-one-(3) in ethyl alcohol is treated with an excess of potassium hydroxide solution and refluxed during 2 hours. The solution is neutralized with hydrochloric acid and concentrated under reduced pressure. Water is added and the solid filtered off and crystallized from dilute ethyl alcohol, M. 195°.

Anal. calcd. for $C_{21}H_{34}O_2$: C, 79.2; H, 10.7. Found: C, 79.4; H, 10.8.

*Androstanedione.*—To a solution of 500 mg. of allo-pregnane-ol-(20)-one-(3) in 8 cc. of glacial acetic acid there is added 500 mg. of freshly fused zinc chloride. The solution is refluxed for three hours, cooled, and diluted with water. A semisolid precipitate separates which after standing overnight is filtered off. It is dissolved in 100 cc. of chloroform and ozone passed into the solution during 30 minutes at 0° at the rate of 7 liters of ozone per hour. The chloroform is evaporated at 25° and the residue taken up in 100 cc. of glacial acetic acid and heated on a steam bath for one hour. The solution is then cooled to room temperature and 100 mg. of chromic anhydride added. After 30 minutes, methyl alcohol is added, the solvents evaporated at 40° and the residue dissolved in 50 cc. of water and 50 cc. of ether. The ether solution is separated, washed with 5 percent sodium hydroxide to free it of organic acids, and evaporated to dryness. The residue upon sublimation in a high vacuum yields two fractions. The higher fraction gives a material M. 185°. The lower fraction is resublimed at 110°, and then crystallized from acetone, M. 128°. Yield, 40 mg.

Anal. calcd. for $C_{19}H_{28}O_2$: C, 79.1; H, 9.8. Found: C, 78.4; H, 9.9.

In order to prove the identity of the androstanedione obtained as described above with that derived from the male sex hormone series, a sample of pure androsterone is oxidized with chromic oxide in acetic acid. There is isolated, as a product of this reaction and as described below, a sample of androstanedione which is identical with the androstanedione prepared by the new method.

*Oxidation of androsterone.*—To a solution of 335 mg. of androsterone in 120 cc. of acetic acid there is added 116 mg. of chromic oxide. This is kept at 15-20° for 13 hours, then at 25-30° for 8 hours. Methyl alcohol is added and the solvents evaporated under reduced pressure. Water is added and the precipitate crystallized from acetone, M. 132°.

Anal. calcd. for $C_{19}H_{28}O_2$: C, 79.1; H, 9.8. Found: C, 79.3; H, 9.7.

A mixture of a sample of androstanedione made by the new process with a sample made by the oxidation of androstanedione gives a melting point of 128-129°.

In order to illustrate the invention more thoroughly, the following formulas and schematic illustrations of the reactions in the above examples are given:

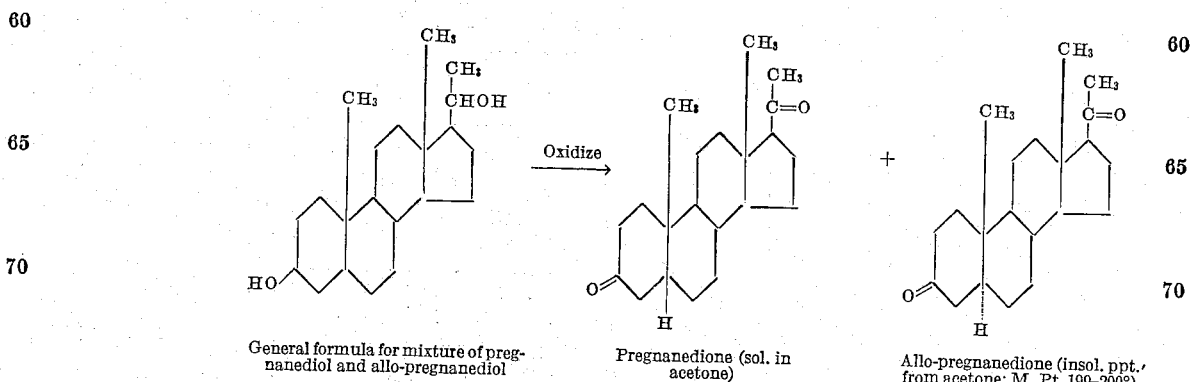

General formula for mixture of pregnanediol and allo-pregnanediol

Pregnanedione (sol. in acetone)

Allo-pregnanedione (insol. ppt. from acetone; M. Pt. 199-200°)

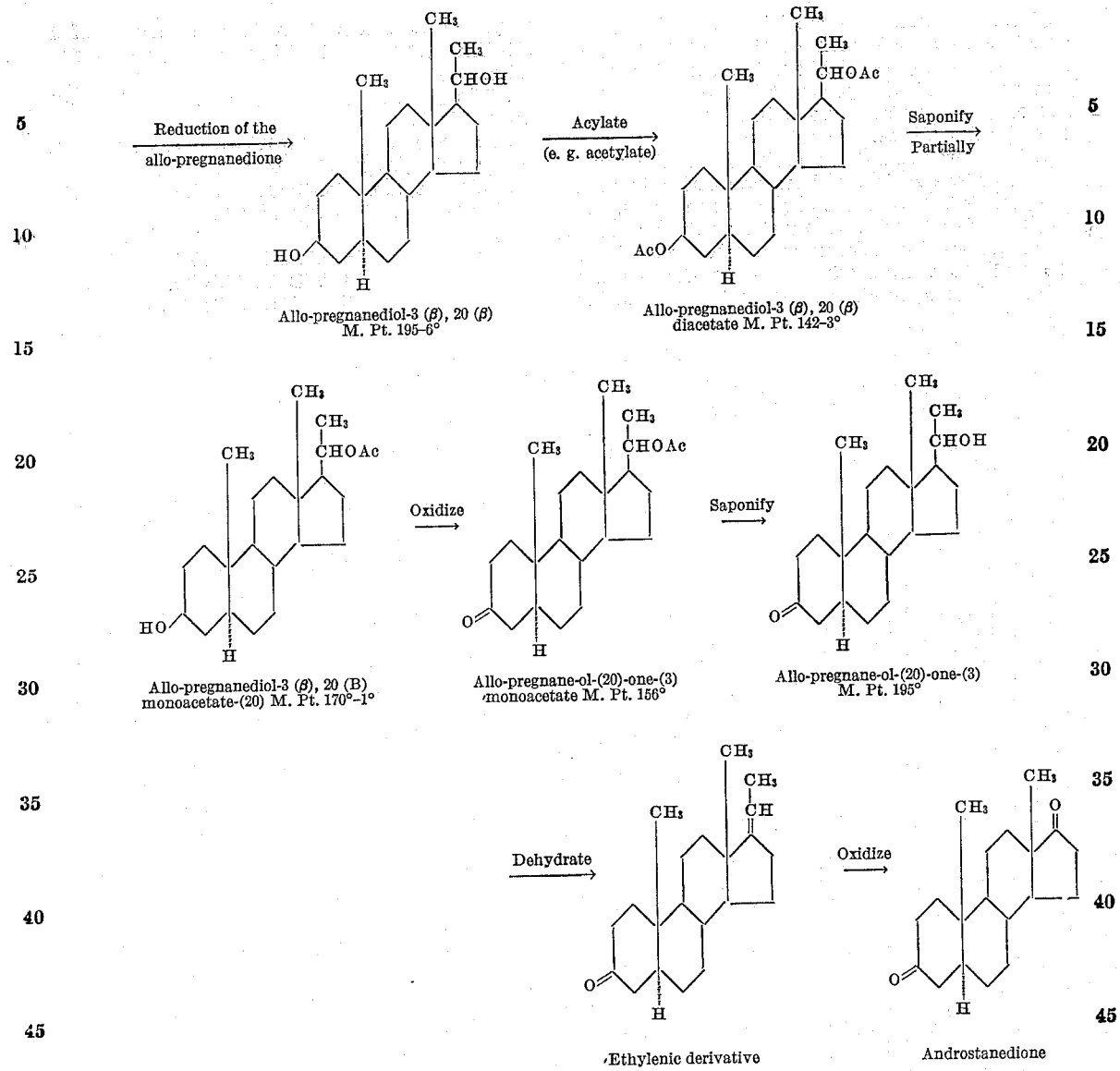

The allo-pregnanediol-3(β),20(β) of this invention and its mono- and diacetates, as well as the allo-pregnane-ol-(20)-one(3) and its monoacetate, are new compounds.

Numerous specific embodiments of the invention, other than those given in the examples, come within the purview of the invention as defined by the appended claims.

The subject matter disclosed herein relating to the allo-pregnanolone compounds is claimed in our copending application, Serial No. 238,060, filed October 31, 1938.

What we claim as our invention is:

1. Process for the preparation of androstanedione comprising reducing an allo-pregnanedione to an allo-pregnanediol, acylating the allo-pregnanediol to its di-acylated derivative, partially saponifying the latter to its mono-acylate-(20), oxidizing the mono-acylate-(20) to the mono-acylate of allo-pregnanol-(20)-one-(3), dehydrating the ol-one at its secondary alcohol grouping to the corresponding ethylenic ketone and oxidizing said ketone to androstanedione.

2. Process for the preparation of androstanedione comprising reducing an allo-pregnanedione to an allo-pregnanediol of melting-point about 195–196° C., acetylating the allo-pregnanediol to its di-acetyl derivative, partially saponifying the latter to its mono-acetate-(20), oxidizing the mono-acetate-(20) to the mono-acetyl derivative of allo-pregnanol-(20)-one-(3), saponifying the latter to allo-pregnanol-(20)-one-(3), dehydrating the ol-one at its secondary alcohol grouping to the corresponding ethylenic ketone and oxidizing said ketone to androstanedione.

3. Process for the preparation of androstanedione comprising catalytically hydrogenating an allo-pregnanedione to an allo-pregnanediol, acetylating the allo-pregnanediol to its di-acetyl derivative, partially saponifying the latter to its mono-acetate-(20), oxidizing the mono-acetate-(20) with chromic oxide in acetic acid to the mono-acetate of allo-pregnanol-(20)-one-(3), saponifying the latter to allo-pregnanol-(20)-one-(3), dehydrating the allo-pregnanol-(20)-one-(3) at its secondary alcohol grouping to the corresponding ethylenic ketone by means of zinc chloride and oxidizing said ketone by ozonolysis to androstanedione.

4. The steps in a process for the preparation of androstanedione comprising partially saponifying a di-acylated allo-pregnanediol to its allo-pregnanediol mono-acylate-(20), oxidizing the latter to allo-pregnanol-(20)-one-(3) mono-acylate, completely saponifying the allo-pregnanol-(20)-one-(3) mono-acylate to allo-pregnanol-(20)-one-(3), dehydrating the ol-one at its secondary alcohol grouping to the corresponding ethylenic ketone and oxidizing said ketone to androstanedione.

5. In a process for the preparation of a compound of the male sex hormone series from a compound of the female sex hormone series, the steps which comprise dehydrating a 20-hydroxy-3-keto allo-pregnane compound between C-atoms $C_{17}$ and $C_{20}$ with production of a $C_{17}$-$C_{20}$ unsaturated compound, and oxidizing the latter compound at its $C_{17}$ atom with production of a 3,17-diketo-compound of the male sex hormone series.

6. Allo-pregnanediol-3($\beta$),20($\beta$), melting at about 196° C.

7. Allo-pregnanediol-3($\beta$),20($\beta$) diacetate, melting at approximately 143° C.

8. Allo-pregnanediol-3($\beta$),20($\beta$) mono-acetate, melting at approximately 171° C.

RUSSELL EARL MARKER.
DAVID M. JONES.
THOMAS S. OAKWOOD.